United States Patent [19]

Judice

[11] 3,953,668

[45] Apr. 27, 1976

[54] METHOD AND ARRANGEMENT FOR ELIMINATING FLICKER IN INTERLACED ORDERED DITHER IMAGES

[75] Inventor: Charles Norris Judice, Lincroft, N.J.

[73] Assignee: Bell Telephone Laboratories, Incorporated, Murray Hill, N.J.

[22] Filed: May 27, 1975

[21] Appl. No.: 580,910

[52] U.S. Cl.............................. 178/6; 178/DIG. 3
[51] Int. Cl.² ........................................ H04N 7/12
[58] Field of Search.................... 178/6, 6.8, DIG. 3

[56] References Cited
UNITED STATES PATENTS

| | | |
|---|---|---|
| 3,244,808 | 4/1966 | Roberts.................................. 178/6 |
| 3,562,420 | 2/1971 | Thompson ............................. 178/6 |
| 3,739,082 | 6/1973 | Lippel..................................... 178/6 |
| 3,877,022 | 4/1975 | Lehman......................... 178/DIG. 3 |
| 3,882,270 | 5/1975 | Ogawa........................... 178/DIG. 3 |

*Primary Examiner*—Howard W. Britton
*Attorney, Agent, or Firm*—Ronald D. Slusky

[57] ABSTRACT

The flicker which results when an ordered dither image is displayed in an interlaced-field format is eliminated by energizing each display point of the interlaced-field display to have an intensity proportional to the average intensity of a cluster of (illustratively four) cells of the dithered image rather than the intensity of a single one of the cells.

21 Claims, 7 Drawing Figures

METHOD AND ARRANGEMENT FOR ELIMINATING FLICKER IN INTERLACED ORDERED DITHER IMAGES

BACKGROUND OF THE INVENTION

The present invention relates to video signal processing generally and, in particular, to the presentation of ordered dither images in an interlaced-field format.

Ordered dither, or more simply, "dither," is a video signal processing technique which provides bi-level display systems with gray-scale, or continuous-tone capability. At the heart of a bi-level display system is a display panel typically comprising a matrix of individual, closely spaced display cells each of which resides in one of two visual states. That is, each display cell is either completely energized (on) or completely de-energized (off). A plasma panel, for example, is one known type of bi-level display panel. Picture images and other graphic data are readily displayed on a bi-level display panel via selective energization of its cells.

Since the cells of a bi-level display panel are either completely on or completely off, the panel has no inherent capability for representing gray scale, i.e. varying intensities in reproduced images. Advantageously, however, the gray-scale information in an image can be approximated on a bi-level display panel by appropriate arrangement of on and off cells.

Dither processing is one known technique for determining which cells should be on and which off. The image to be reproduced is divided into a matrix of picture elements, each element corresponding to a respective cell of the display panel. A dither threshold value is assigned to each picture element from a predetermined "dither matrix." If the intensity of any given picture element is greater than the dither threshold value assigned thereto, the corresponding display cell is turned on. Otherwise it is maintained off.

Dithered image signals occupy substantially less bandwidth than other types of video signals such as standard television signals. The tradeoff is slightly reduced spatial resolution. However, for many video applications including face-to-face conversation, area surveillance, engineering and medical graphics exchange, cassette teaching systems and others, this tradeoff is most advantageous. For example, the narrow bandwidth occupied by a dither-processed image signal enables the use of regular telephone lines or other narrow-band media to transmit the image signal.

Although ordered dither was developed principally for use in bi-level display systems, it may be desirable to display dithered images on a conventional cathode-ray tube (CRT) display using the CRT in a bi-level mode. Such arrangements advantageously minimize both transmission bandwidth requirements and display hardware costs; at the present time. CRT displays are very much less expensive than plasma or other bi-level display panels.

A problem arises, however, because conventional CRT systems use an interlaced-field format. When a dithered image is displayed in this format, the two fields of each frame have unequal brightness because of the way in which the threshold values of a dither matrix are spatially distributed therein. The result is an annoying flicker in the displayed image. At least two techniques for minimizing this flicker are known. These techniques involve the modification or rearrangement of the dither threshold values within the dither matrix. One of the known techniques eliminates much but, disadvantageously, not all of the flicker. The other achieves better flicker reduction but, disadvantageously, only at a loss of substantial intensity resolution.

SUMMARY OF THE INVENTION

Accordingly an object of the present invention is to provide an improved dithered display system.

A more particular object of the invention is to provide an improved method and arrangement for eliminating the flicker which results from the display of dithered images in an interlaced-field format.

These and other objects are achieved in accordance with the invention by a technique herein referred to as "area weighting." Each display point of the interlaced-field display is energized to have an intensity proportional to the average intensity of a cluster of cells (e.g., four cells) of the dithered image rather than the intensity of a single dithered image cell. This has the effect of averaging the brightness of each two-line pair which, in turn, eliminates the flicker.

BRIEF DESCRIPTION OF THE DRAWING

The invention may be clearly understood from a consideration of the following detailed description of an illustrative embodiment of the invention and accompanying drawing in which:

FIG. 4 shows picture element intensities, dither threshold values and dither display bit values for an illustrative image scanned and displayed by the system of FIGS. 1 and 2;

DETAILED DESCRIPTION

Figure 1:
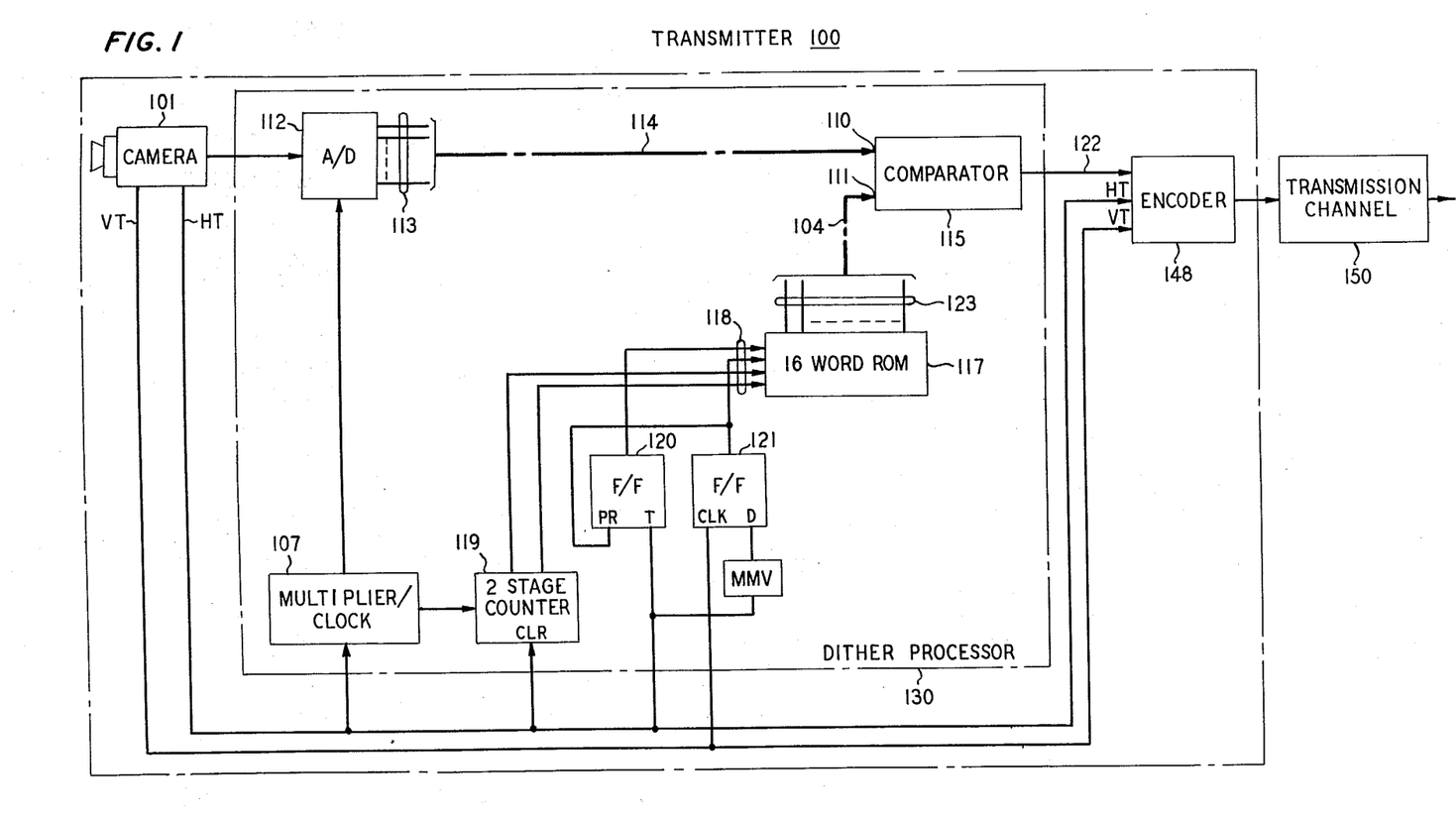
FIGS. 1 and 2 depict, when the former is arranged to the left of the latter, a dithered display system which includes area weighting circuitry in accordance with the invention.
Figure 2:
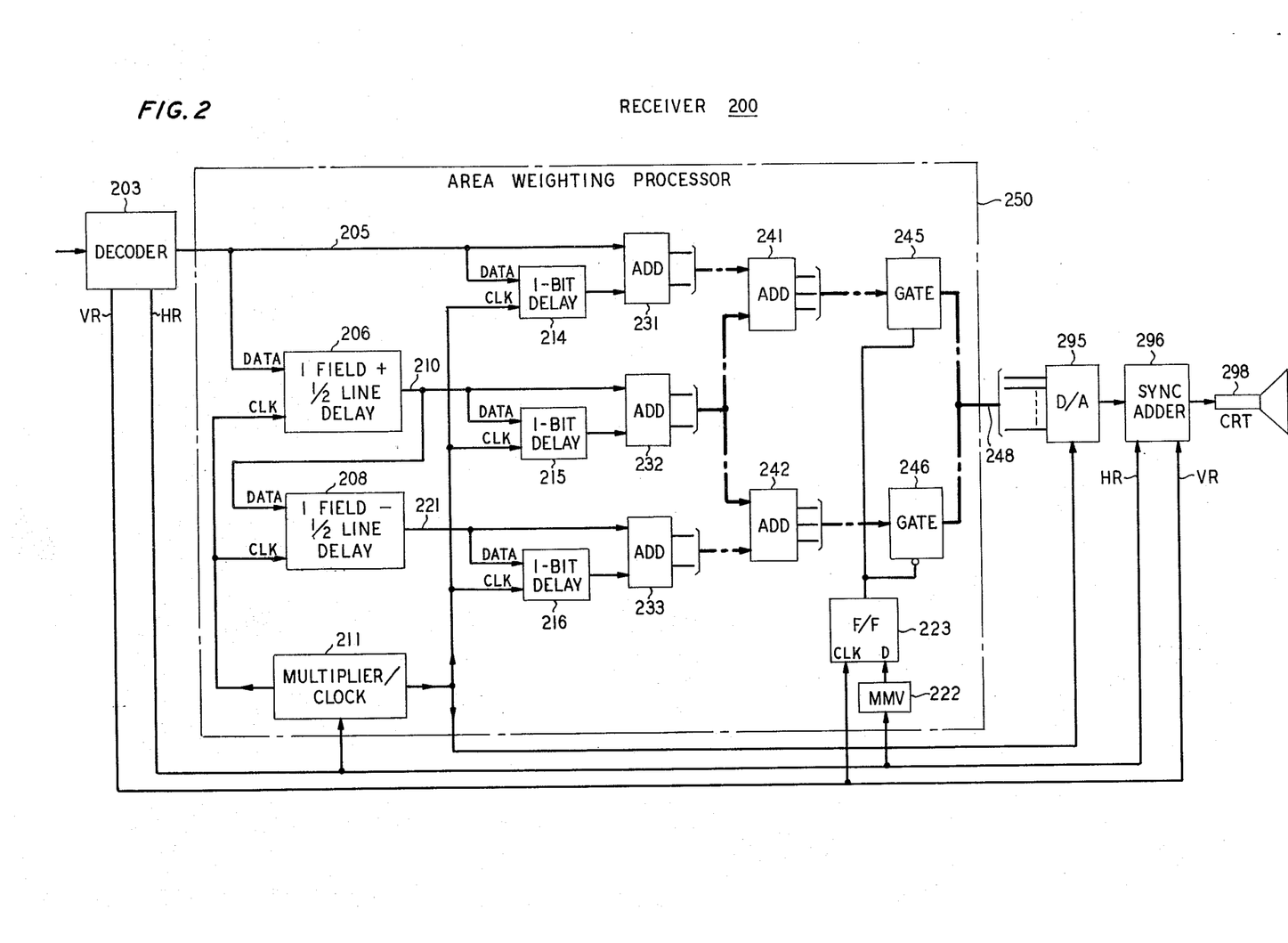

The display system of FIGS. 1 and 2 comprises transmitter 100, transmission channel 150 and receiver 200. Transmitter 100 includes camera 101, which scans picture images in a standard two-field/frame interlaced format. Transmitter 100 further includes dither processor 130 which generates ordered dither representations of the images scanned by camera 101. These dithered images are extended to receiver 200 via transmission channel 150 and are ultimately presented by cathode-ray tube (CRT) display 298, again in a two-field/frame interlaced format. Receiver 200 advantageously includes area weighting processor 250 which implements the area weighting techniques of the present invention to eliminate the flicker which would otherwise appear in the images presented by CRT display 298.

Figure 3:
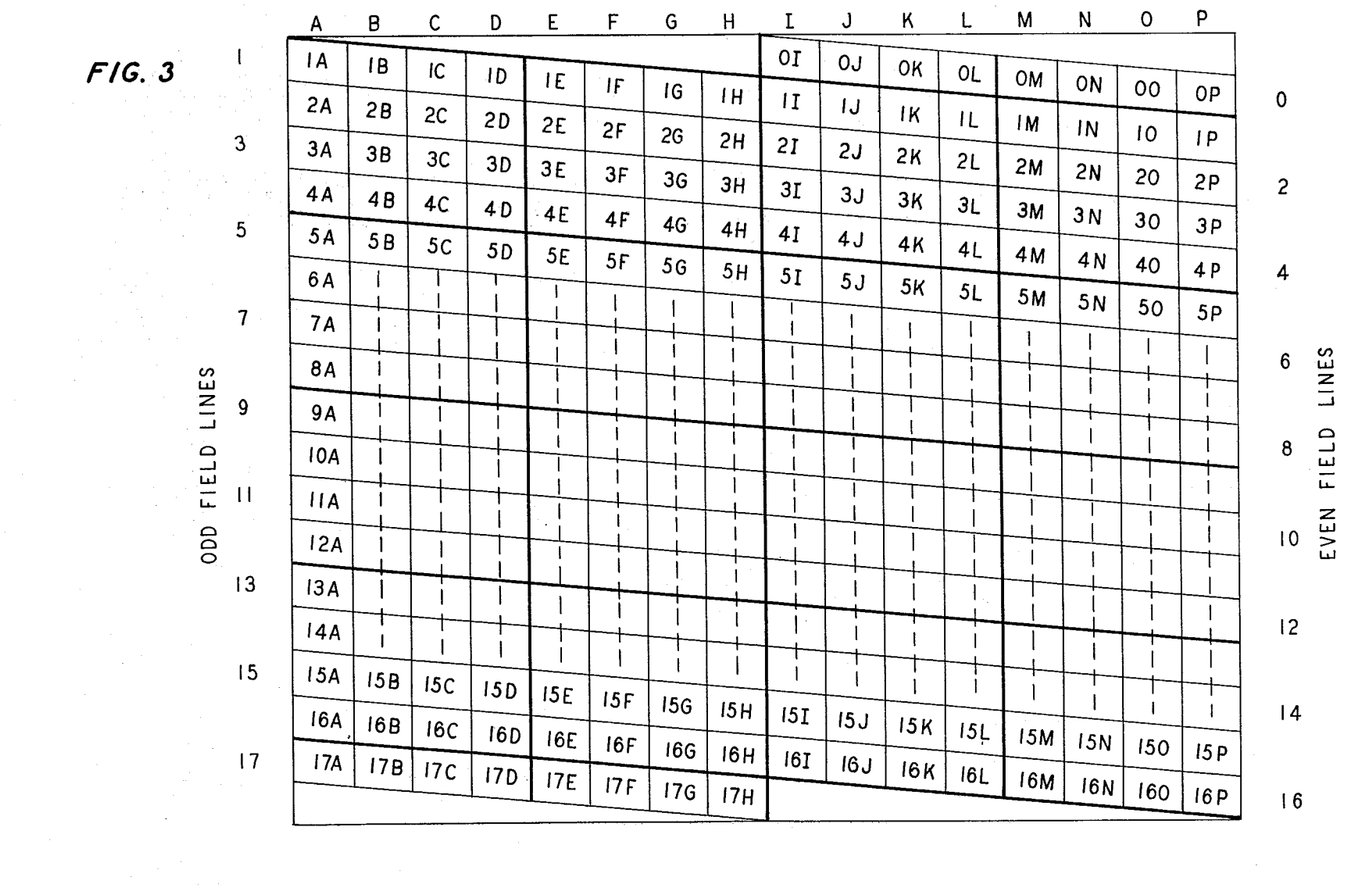
FIG. 3 shows the interlaced scanning format utilized in the system of FIGS. 1 and 2.

More particular reference is now made to transmitter 100. As shown in FIG. 3, camera 101 scans each picture image frame in two interlaced fields of 8½ scan lines each. Scanning of each frame begins with the first, or "odd," field. This field starts with line 1 and continues left to right for each successive off-numbered line. The scan lines are pitched slightly downward from left to right, as shown in exaggerated fashion in FIG. 3. Line 17, the last line of this first field, is a half-line and terminates halfway across the image. Camera 101 then retraces vertically to begin scanning the second field of the frame. The second field comprises the even-numbered lines beginning with line O, which is also a half-line. Scanning in the second field continues with each successive even-numbered line through line 16 and then recommences with the first field of the next frame.

The illustrative seventeen-line/frame format of FIG. 3 has been chosen for simplicity and clarity of explanation. It will be appreciated, however, that the present invention may be implemented in an interlaced system having any number of lines per frame including, for example, standard television (525-line) format.

Camera 101 generates an analog signal representing the instantaneous intensity of the image along each scan line and extends that signal to analog-to-digital (A/D) converter 112. Camera 101 additionally provides a horizontal sync pulse on lead HT as it completes its scanning of each line. Similarly, camera 101 provides a vertical sync pulse on lead VT as it completes its scanning of each field.

Multiplier/clock 107 generates sixteen clock pulses for each horizontal sync pulse on lead HT and extends these clock pulses to A/D converter 112. Each full line of the scanned image is thereby divided into sixteen samples, or picture elements, A through P. The scanned image is thus seen to comprise a row-and-column matrix of these picture elements. A/D converter 112 quantizes the intensity of each picture element of the matrix into one of (illustratively) 256 levels between 0 and 255. The intensity of each picture element is provided in digital form on leads 113 as it is scanned, and is extended via cable 114 to first input terminal 110 of multibit comparator 115.

At the same time, a dither threshold value assigned to the picture element being scanned is extended to second input terminal 111 of comparator 115, via cable 104. The dither threshold values are taken from a predetermined dither matrix—illustratively the sixteen-element matrix $$\begin{bmatrix} 0 & 128 & 32 & 160 \\ 192 & 64 & 224 & 96 \\ 48 & 176 & 16 & 144 \\ 240 & 112 & 208 & 80 \end{bmatrix}$$

As indicated by the heavier lines in FIG. 4, the scanned image picture element matrix may be conceptualized as being divided into a plurality of 4-by-4 submatrices. Each picture element of each submatrix has assigned thereto a different threshold value from the above dither matrix. The picture element intensities and assigned dither threshold values for part of an illustrative scanned image are shown in the upper portion of FIG. 4. The intensity of each picture element is the upper number within the corresponding box in FIG. 4; the dither threshold value assigned to the picture element is the lower number.

Comparator 115 generates an output 1 if the intensity of a given picture element exceeds its assigned dither threshold value. Otherwise, an output 0 is generated. The resultant dither bit stream on lead 122 represents the pattern of on (1) and off (0) cells for a dithered version of the image scanned by camera 101. When a large matrix of closely spaced bi-level display cells are selectively energized in accordance with this dither bit pattern, a dither-processed, gray-scale representation of the image is provided. See, for example, the partial bit pattern matrix in the lower portion of FIG. 4, and also the dithered images in my copending patent aplication Ser. No. 560,505, filed Mar. 19, 1975, and also U.S. Pat. No. 3,925,609, issued to W. H. Ninke on Dec. 9, 1975.

The circuitry which provides the dither threshold values on cable 104 as described above includes read-only memory (ROM) 117. This device stores the threshold values of the above dither matrix in the order 0, 128, 32, 160, 192, 64, 224, 96, 48, 176, 16, 144, 240, 112, 208, 80. Binary representations of these numbers are provided on output leads 123 in response to the binary addresses 0000, 0001, 0010, 0011, 0100, 0101, 0110, 0111, 1000, 1001, 1010, 1011, 1100, 1101, 1110, 1111, respectively, on address leads 118.

Addresses are generated on leads 118 by circuitry including monostable multivibrator 103, two-stage binary counter 119, toggle (T-type) flip-flop 120 and delay (D-type) flip-flop 121. Counter 119 advances one count for each pulse from multiplier/clock 107. It is cleared to 0 at the beginning of each scan line via the pulses on lead HT.

Flip-flop 121 switches to its 0 state at the beginning of each odd field and to its 1 state at the beginning of each even field. This mode of operation is achieved by providing the D input signals for flip-flop 121 from monostable multivibrator 103. The latter, in turn, is triggered from lead HT. Clock (Ck) signals for flip-flop 121 are provided from lead VT. Multivibrator 103 provides a 0 output in its stable state and a 1 output in its quasi-stable state. The duration of the quasi-stable state is nominally three-quarters of one full line scan time. Thus at the end of each even field, which terminates in a full line, multivibrator 103 is in its 0 state. At the end of each off field, which terminates in a half-line, it is in its 1 state. The vertical sync pulse at the end of each even field thus establishes flip-flop 121 in its 0 state in preparation for the odd field which follows. On the other hand, the vertical sync pulse at the end of each odd field establishes flip-flop 121 in its 1 state in preparation for the even field which follows.

Flip-flop 120 switches from its 0 state to its 1 state and back to its 0 state in response to successive pulses on lead HT. It is preset to its 0 state at the beginning of each odd field and to its 1 state at the beginning of each even field via a connection to its Preset terminal PR from the outout of flip-flop 121.

When a frame starts, counter 119 and flip-flops 120 and 121 are all in their 0 states. The address 0000 is provided on leads 118 followed by the addresses 0001, 0010 and 0011 in response to each of the next three clock pulses. This four-address cycle then repeats. Thus the dither threshold values 0, 128, 32 and 160 are repetitively extended in the sequence stated to input terminal 111 of comparator 115 as line 1 is scanned. Each picture element of line 1 is thereby compared to the proper dither threshold value indicated in FIG. 4.

After line 1 has been scanned, the horizontal synch pulse on lead HT clears counter 119 and switches flip-flop 120 to its 1 state so that successive clock pulses repetitively cause the addresses 1000, 0001, 1010 and 1011 to be generated on leads 118, thus repetitively generating the dither threshold values 48, 176, 16 and 144 in the sequence stated for comparison with the picture elements of line 3. The next horizontal sync pulse returns flip-flop 120 to its 0 state, generating the addresses 0000, 0010 and 0011 for line 5, and so forth.

When the first field of the frame has been completed, counter 119 is cleared to its 0 state, while flip-flops 120 and 121 are established in their 1 states. Thus for line 0, the addresses 1100, 1101, 1110 and 1111 are repetitively generated serially on leads 118. The dither threshold values 240, 112, 208 and 80 are repetitively provided serially on cable 104. Then for line 2, the addresses 0100, 0101, 0110 and 0111, and thus the dither threshold values 192, 64, 224 and 96 are generated. The cycle repeats for lines 4, 6, 8, etc.

The dither bit stream on lead 122 and the horizontal and vertical sync pulses on leads HT and VT are combined by encoder 148 and encoded into any convenient transmission format. The encoded signal is extended over transmission channel 150 to receiver 200. Decoder 203 extends the decoded dither bit stream to area weighting processor 250 on lead 205. The bit stream is processed in accordance with the invention as described hereinafter, and is then converted to analog form by D/A converter 295. At the same time, decoder 203 provides the decoded horizontal and vertical sync pulses on leads HR and VR, respectively. These are combined with the analog output of D/A converter 295 in sync adder 296. The combined signal is extended to CRT display 298 for presentation.

It is to be emphasized at this point that both the size of the dither matrix utilized in the display system of FIGS. 1 and 2, as well as the particular threshold values thereof, are merely illustrative. Advantageously, increasing the number of threshold values (and correspondingly, of course, the size of each picture element submatrix) increases the number of shades of gray which are represented in the reproduced image. As the size of the dither matrix is increased, however, the distinction between the numerous shades of gray represented may become too subtle for the viewer to perceive. Factors to be taken into account in choosing the dither matrix size include the distance from which observers are expected to view the dithered image, the overall dimensions of the display medium, and the nature of the images to be presented.

Once an appropriate dither matrix size has been selected for the display application at hand, the threshold values themselves are chosen. It is conventional to choose the threshold values of a dither matrix such that they are distributed across substantially the entire quantization range (in the present application, the range 0–255), with numerically successive threshold values having a constant difference between them. However, other threshold value selection criteria may be employed to provide, for example, increased or decreased contrast and/or brightness in the dithered image. See my copending application Ser. No. 560,505, filed Mar. 19, 1975.

The selected threshold values are then arranged within the dither matrix. It has been found that optimum gray-scale and picture resolution characteristics are achieved when numerically successive threshold values are spatially separated from one another within the matrix. In the above dither matrix, for example, the 0 is relatively distant from the 16, which is relatively distant from the 32 and so forth.

More generally, the above-described spatial separation criterion can be satisfied for an $n$-by-$n$ dither matrix, for example, $n$ being an integer power of 2, by arranging the $n^2$ threshold values of the dither matrix in the order defined by the dither operator $\hat{D}_n$. The latter is derived by combining the four operator matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangement such as $$\hat{D}_n = \begin{bmatrix} [4\hat{D}_{n/2}] & [4\hat{D}_{n/2} + 2\hat{U}_{n/2}] \\ [4\hat{D}_{n/2} + 3\hat{U}_{n/2}] & [4\hat{D}_{n/2} + \hat{U}_{n/2}] \end{bmatrix}$$

This is a recursive definition in which $D_2$ is a two-by-two matrix comprising the numbers 0, 1, 2 and 3 such as the matrix $$\begin{bmatrix} 0 & 2 \\ 3 & 1 \end{bmatrix}$$

and $\hat{U}_2$ is a two-by-two matrix each element of which is 1. It is preferable, although not necessary, that the operator matrices $[4\hat{D}_{n/2}]$ and $[4\hat{D}_{n/2} + \hat{U}_{n/2}]$ be on the same one diagonal of dither operator $\hat{d}_n$, such as in the above arrangement, and the numbers 0 and 1 be on the same one diagonal of operator matrix $\hat{D}_2$.

Using the above definition, one of several possible $\hat{D}_4$ dither operators, for example, is $$\hat{D}_4 = \begin{bmatrix} 0 & 8 & 2 & 10 \\ 12 & 4 & 14 & 6 \\ 3 & 11 & 1 & 9 \\ 15 & 7 & 13 & 5 \end{bmatrix}.$$

The dither matrix, $$\begin{bmatrix} 0 & 128 & 32 & 160 \\ 192 & 64 & 224 & 96 \\ 48 & 176 & 16 & 144 \\ 240 & 112 & 208 & 80 \end{bmatrix},$$

is thus seen to have been derived by taking the threshold values 0, 16, 32, 48, etc., which were previously selected, and placing them in the 0, 1, 2, 3, etc., positions, respectively, of the $\hat{D}_4$ dither operator.

The problem to which the present invention is directed may be appreciated by further reference to FIG. 4. In particular, it will be noticed that each odd-line dither threshold value is smaller than at least one of the dither threshold values in either of the adjacent even lines. Thus in an entire dithered image, more odd-field picture elements can be expected to have intensities which exceed their assigned dither threshold values. Thus the odd field of each frame has more on cells and is somewhat brighter than the even field of the same frame. It is well known in the video display art that when the two interlaced fields of a video display frame (whether generated via dither processing or elsewise) are of unequal brightness, an annoying flicker is created in the displayed image.

This flicker is advantageously eliminated in accordance with the present area weighting technique. Each display point of the interlaced-field display is energized to have a magnitude, or intensity, porportional to the average intensity of a submatrix, or cluster, of the dithered image cells rather than the intensity of a single cell. This has the effect of averaging the brightness of each two-line pair which, in turn, eliminates the flicker.

Figure 5:
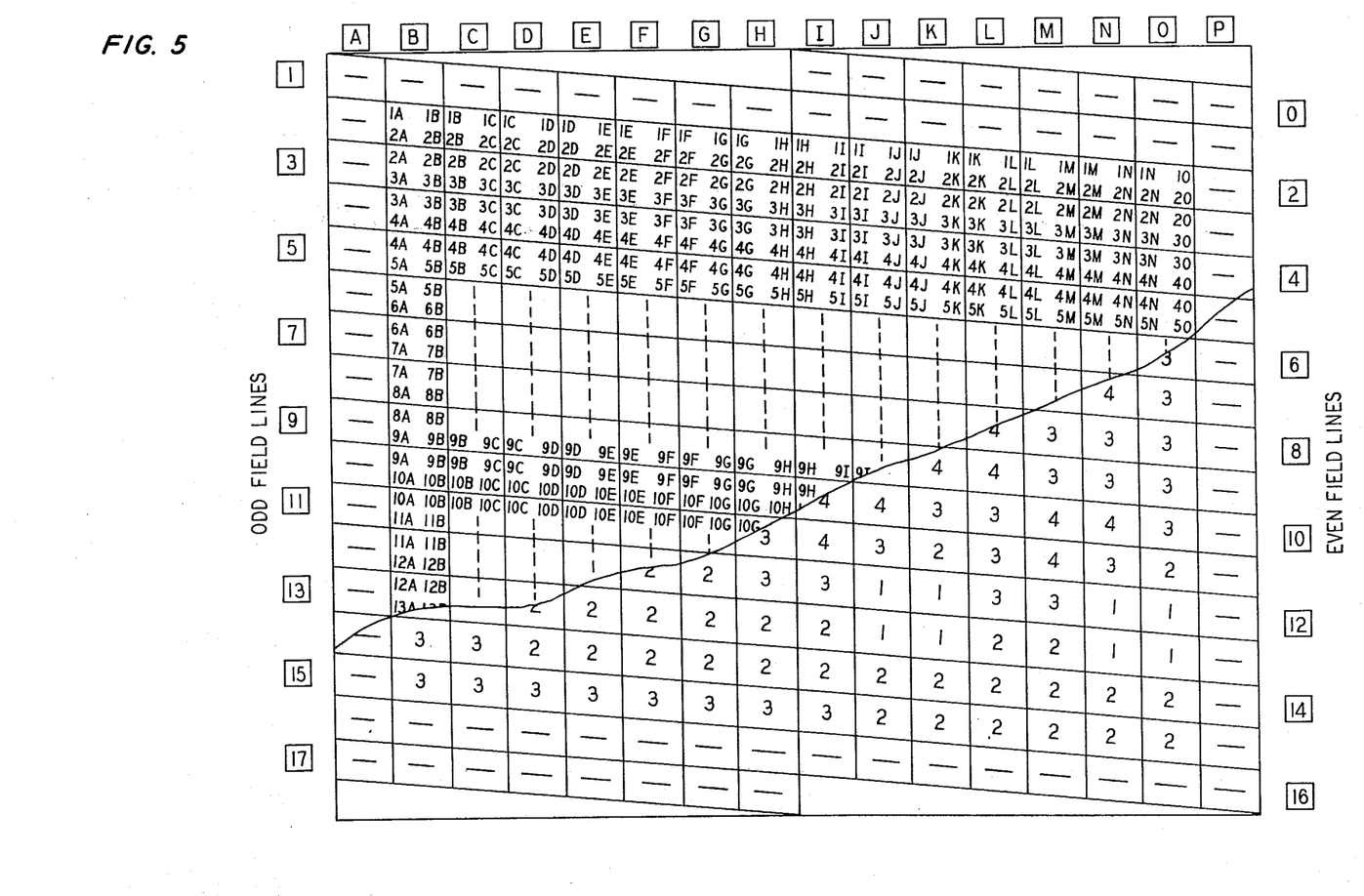
FIG. 5 shows one way in which the cell intensities of a dithered image may be combined in accordance with the invention to generate an area weighted image.

FIG. 5 represents the interlaced-field image presented by CRT display 298. The 17 scan lines of display 298 comprise odd-field lines 1 through 17 and even-field lines 0 through 16. Each full line comprises 16 display points A through P. The displayed image is thus seen to comprise a row-and-column matrix of these display points. The intensity of each display point of CRT display 298 is proportional to the average intensity of a different cluster of (illustratively) four cells of the original dithered image. This is illustratively accomplished simply by adding together the binary values (0 or 1) of the cells of each two-by-two submatrix of the dithered image cells. For example, the intensity for display point 2B, i.e., display point B in line 2 of the area weighted image, is generated by adding the binary values of the cells in the submatrix comprising display cells 1A, 1B, 2A and 3B of the original dithered image of FIG. 4. Thus area weighting processor 250 provides on its binary output caable 248 any one of the five values 0, 1, 2, 3 and 4 for each display point of the area weighted image, depending on how many cells of the corresponding dithered image cluster are on. The display point intensities for an area weighted version of the dithered image in the lower portion of FIG. 4 is shown in the lower portion of FIG. 5. Appropriate scaling of the display point intensities for presentation on CRT display 298 is illustratively provided by D/A converter 295, which may include an amplifier (not shown) for this purpose.

As indicated in FIG. 5, one-and-a-half lines of each field and the first and last display points of each line of the area weighted image are blanked out, i.e., set to zero, when displayed by CRT display 298. This is a standard practice which corrects for noise in the system and/or slight transmitter-receiver synchronization errors. Further, it eliminates some non-meaningful display information generated by processor 250, as is explained hereinbelow. Blanking is effected within CRT display 298 in conventional fashion in response to blanking pulses which may be generated within sync adder 296, for example. Since such blanking techniques are standard in the art, this aspect of the embodiment need not be described in further detail.

Area weighting processor 250 includes delay units 206, 208, 214, 215 and 216, and multiplier/clock 211. The latter, which is substantially similar to multiplier clock 107 in dither processor 130, drives the abovementioned delay units as well as D/A converter 295. Processor 250 further includes adders 231, 232, 233, 241 and 242, and gates 245 and 246.

Delay unit 206 delays the dither bit stream on lead 205 for a time equal to the duration of one field plus one half-line, i.e., nine lines. Delay unit 208, responsive to the output of delay unit 206 on lead 210, further delays the dither bit stream for a time equal to the duration of one field minus one half-line, i.e., eight lines.

Adder 231 adds the dither bit stream of lead 205 with a version of same delayed one bit by delay unit 214. Adder 232 adds the output of delay unit 206 with a version of same delayed one bit by delay unit 215. Adder 233 adds the output of delay unit 208 (on lead 221) with a version of same delayed one bit by delay unit 216. Adder 241 adds the outputs of adders 231 and 232. Adder 242 adds the outputs of adders 232 and 233.

Area weighting processor 250 further includes monostable multivibrator 222 and D-type flip-flop 223. The clock (Ck) input of flip-flop 223 is provided from vertical sync lead VR. Its D input is provided from multivibrator 222. The latter, in turn, is triggered from horizontal sync lead HR. The multivibrator output is 0 in its stable state and 1 in its quasi-stable state. The duration of the quasi-stable state is nominally three-fourths of one full line scan time. Thus at the end of each off field, multivibrator 222 is in its 1 state and flip-flop 223 is switched to its 1 state for the succeeding, even field. At the end of each even field, on the other hand, multivibrator 222 is in its 0 state and flip-flop 223 is switched to its 0 state for the succeeding, odd field. Thus when the dither bit stream on lead 205 comprises odd-field data, gates 245 and 246 are closed and open, respectively, and the output of area weighting processor on cable 248 is derived from adder 241 via gate 245. When, alternatively, the dither bit stream on lead 205 comprises even-field data, gates 245 and 246 are open and closed, respectively, and the data on cable 248 is derived from adder 242 via gate 246.

Figure 6:
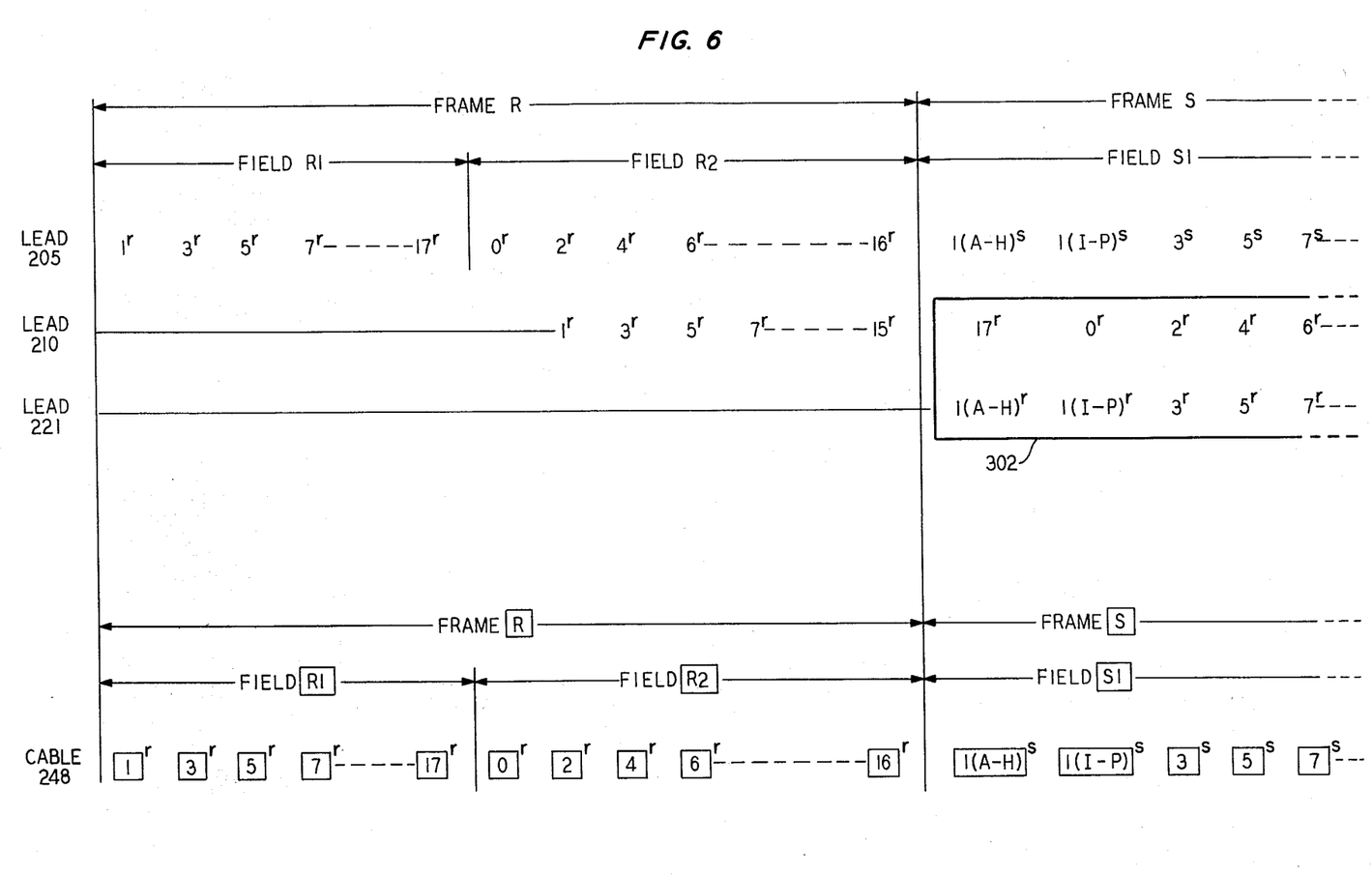
FIGS. 6 and 7 show, when the former is arranged to the left of the latter, a chart useful in explaining the operation of the area weighting circuitry used in the system of FIGS. 1 and 2.
Figure 7:
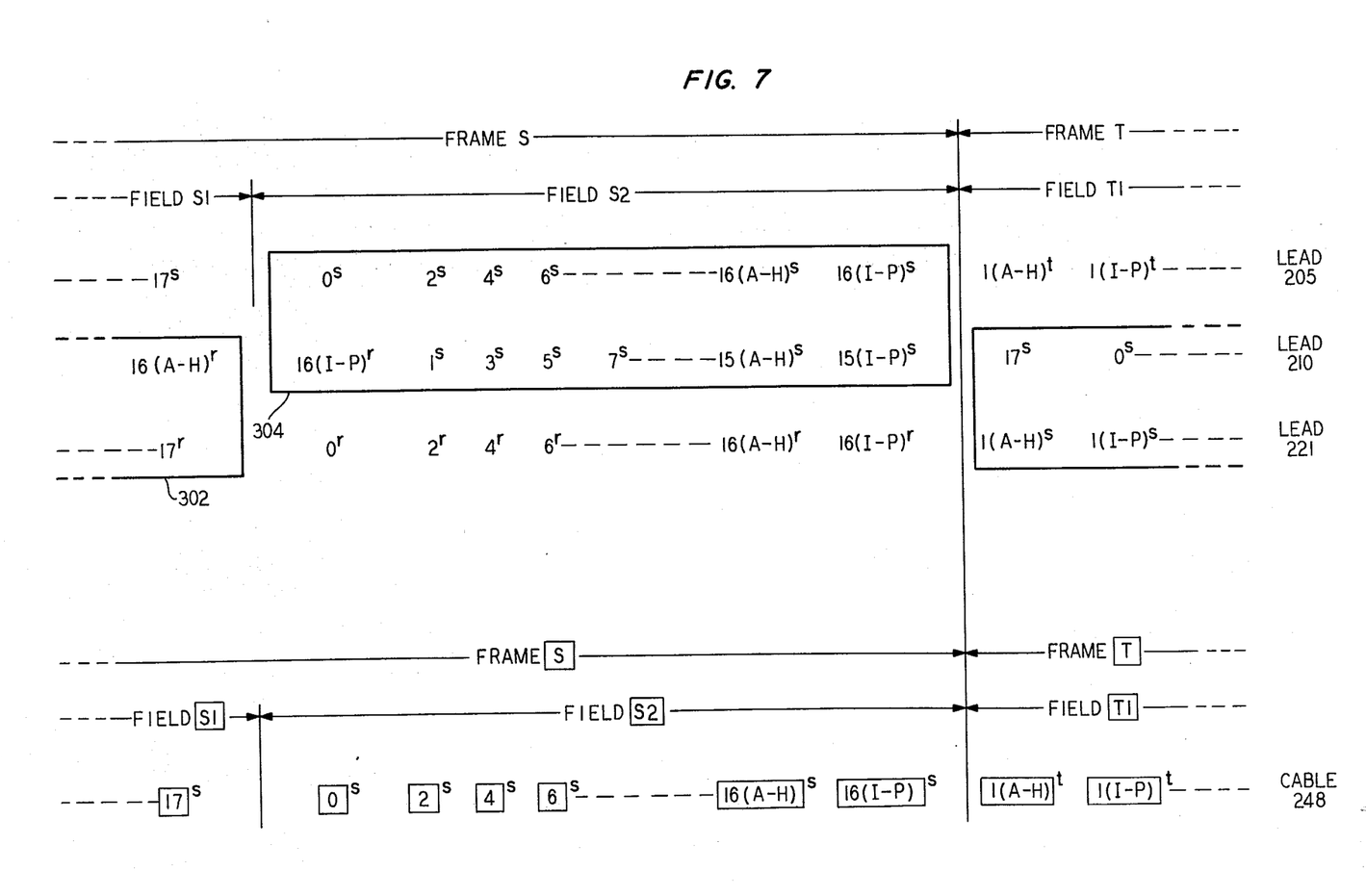

FIGS. 6 and 7, with the former placed to the left of the latter, chart the progress of an illustrative dither bit stream as it proceeds through and is processed by area weighting processor 250. The first two frames of the dither bit stream are frames R and S, respectively. These, as well as all frames of the video sequence, are of equal duration although they appear to be of unequal duration in FIGS. 6 and 7. Frame R comprises fields R1 and R2. Frame S comprises fields S1 and S2.

The sixteen bits representing the states of the cells in each scan line of the original dithered image (FIG. 4) are referenced collectively by their scan line number, with a superscript $r$ or $s$ indicating the frame to which a line belongs. Thus the symbol $7^r$, for example, represents collectively the 16 bit values in the seventh line of dithered frame R. Certain of the scan lines are alternatively represented as two sequential half-lines of eight bits each. Thus, for example, the first line of dithered frame S is indicated both by the symbol $1^s$ and by a combination of the two half-line symbols $1(A-H)^s$ and $1(I-P)^s$.

As indicated above, lead 210 carries the same bit stream as lead 205 but delayed by one field plus one half-line. Thus, the first bit of frame R, i.e., the first bit of line $1^r$, appears on lead 210 at the same time that the first bit of line $2^r$ appears on lead 205. Half-lines $17^r$ and $O^r$ appear on lead 210 at the same time that half-lines $1(A-H)^s$ and $1(I-P)^s$ respectively appear on lead 205. Similarly, half-lines $16(A-H)^r$ and $16(I-P)^r$ appear on lead 210 at the same time as half-lines $17^s$ and $O^s$ respectively appear on lead 205.

As also indicated above, lead 221 carries the same bit stream as lead 210 but delayed by one field minus one half-line. Alternatively stated, lead 221 carries the same bit stream as lead 205 but delayed by the time required to scan one full frame.

The area weighted image frames generated by processor 250 on cable 248 in response to dithered image frames R and S are denominated frames R and S, respectively. The former comprises fields R1 and R2. The latter comprises fields S1 and S2. The symbol 7r, for example, represents the 16 display point values in the seventh line of frame R. Similarly, the symbol 1(A-H)r represents the first half of line 1 of frame R.

By way of example, the operation of processor 250 will now be explained with reference to its generation of area weighted frame S. Throughout field S1, gates 245 and 246 are closed and open, respectively. Thus the data on lead 205 can be ignored during the generation of field S1. Rather, the display point intensity values for field S1 are generated from bit values on leads 210 and 221 as indicated by box 302 in FIGS. 6 and 7.

The first sixteen bits on lead 210 during frame [S] are those of half-lines $17^r$ and $O^r$. The first 16 bits on lead 221 are those of half-lines $1(A-H)^r$ and $1(I-P)^r$. These bits are extended through and combined by delay units 215 and 216, adders 232, 233 and 242 and gate 246 to generate intensity values associated with the display points of line [1]$^s$ of the area weighted image (FIG. 5). Certain of these intensity values do not represent meaningful display information since lines $17^r$ and $1(A-H)^r$ are from opposite ends of the original dithered image. However, this is of no consequence, since line [1]$^s$ of each frame of the area weighted image is blanked when presented by CRT display 298.

The intensity values for the display points of line [3]$^s$ are next generated. Bits $2A^r$ and $3A^r$ are initially provided on leads 210 and 221, respectively. At this time bits $OP^r$ and $1P^r$ are provided at the outputs of delay units 215 and 216, respectively. The intensity value generated for display point [3A]$^s$ is thus the sum of bits $2A^r$, $3A^r$, $OP^r$ and $1P^r$. Although this intensity value does not represent meaningful picture information it, too, is blanked out in CRT display 298.

Meaningful picture information is generated, however, for the rest of line [3]$^s$. The next bits on leads 210 and 221 are bits 2B and 3B, respectively. At this time, bits 2A and 3A are provided at the outputs of delay units 215 and 216, respectively. The intensity value for display point [3B]$^s$ is thus the sum of bits 2A, 2B, 3A and 3B, as may be verified by reference to FIG. 5. The intensity values for display points [3C]$^s$ through [3P]$^s$ as well as those for lines [5]$^s$ through [17]$^s$ are generated in straightforward manner as per the above discussion, thereby completing field [S1].

During field [S2], gates 245 and 246 are open and closed, respectively. Thus the display point intensities for field [S2] are generated from the display bit values on leads 205 and 210 as indicated by box 304 in FIG. 7. Circuitry including delay units 214 and 215 and adders 231, 232 and 241 generate the display point values for field S2 in straightforward manner and thus need not be desribed in further detail.

The illustrative embodiment shown and described herein is merely illustrative of the principles of the invention. It will be appreciated that many and varied arrangements in accordance with those principles may be devised by those skilled in the art without departing from the spirit and scope of the invention.

What is claimed is:

1. A display system including means for receiving a signal representing a matrix of dithered image cells, each of said cells having one of two predetermined intensities, means for generating a signal representing an ordered plurality of rows of display points, each of said display points having an intensity determined in response to said dithered image signal, and means for displaying the intensities of the display points of a selected field of alternate rows of said ordered plurality and for thereafter displaying the intensities of the display points of the others of said rows, said generating means characterized by area weighting means for providing each one of said display points with an intensity determined by the intensity of a group of said cells associated with said each one of said display points.

2. The invention of claim 1 wherein said area weighting means is characterized by means for providing said each one of said display points with an intensity proportional to the average intensity of the group of cells associated therewith.

3. The invention of claim 2 wherein said area weighting means is further characterized in that each said group of cells comprises a selected two-by-two submatrix of said cell matrix.

4. The invention of claim 3 further including means for gnerating said dithered image signal, said further included means comprising means for receiving a signal representing the intensities of a matrix of picture elements each having a predetermined intensity, means for assigning respective dither thresholds to each of said picture elements, and means for providing a first signal indication for each picture element having an intensity which exceeds its assigned dither threshold and a second signal indication for each picture element having an intensity which does not exceed its assigned dither threshold.

5. The invention of claim 4 wherein said picture elements are arranged in a plurality of submatrices of said picture element matrix and wherein said assigning means includes means for assigning to each picture element of each of said submatrices a spatially corresponding threshold value from a predetermined dither matrix in which numerically successive threshold values are spatially separated from one another.

6. The invention of claim 5 wherein said dither matrix comprises $n^2$ dither thresholds, $n$ being an integer power of 2, and wherein said dither thresholds are arranged substantially in accordance with the order defined by a dither operator $\hat{D}_n$, said dither operator $\hat{D}_n$ comprising the matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangement, $\hat{D}_2$ being a two-by-two matrix comprising the numbers 0, 1, 2 and 3 and $\hat{U}_2$ being a two-by-two matrix each element of which is 1.

7. In a system for presenting a dithered image in a plurality of interlaced scan lines, said image comprising a row-and-column matrix of dithered image cells each of which has one of two predetermined intensities.

the improvement comprising means for controlling the intensity along each one of said scan lines in accordance with the intensities of the cells in a selected two adjacent rows of said matrix.

8. The invention of claim 7 wherein said controlling means comprises means for determining the respective average intensities of a plurality of four-cell clusters, each of said clusters comprising a two-by-two submatrix of the cells of said selected rows, and means for controlling the intensity along said each one of said scan lines in response to said average intensities.

9. The invention of claim 8 further comprising means for generating the intensities of said dithered image cells, said further included means comprising means for receiving the intensities of a matrix of picture elements, each of said picture elements being associated with a different one of said cells and eaach having assigned thereto a threshold value from a ptedetermined dither matrix, means for generating a first intensity for each cell having an associated picture element with an intensity which exceeds its assigned dither threshold and for generating a second intensity for each cell having an associated picture element with an intensity which does not exceed its assigned dither threshold.

10. A display system comprising,
means for scanning an image to provide a row-and-column matrix of picture elements each having a predetermined intensity, means for assigning each of a predetermined plurality of dither threshold values to a different one of the picture elements of at least a first submatrix of said picture elements, means for generating an area-weighted intensity corresponding to each one of said picture elements, said area-weighted intensity being determined by the number of picture elements in a selected cluster thereof which have intensities greater than their respective assigned dither threshold values, said selected cluster including at least said one of said picture elements, second and third picture elements each immediately agjacent in said picture element matrix to said one of said picture elements and a fourth picture element immediately adjacent in said picture element matrix to both said second and said third picture elements, and means for displaying the area-weighted intensities which correspond to the picture elements in a selected set of alternate rows of said matrix and for thereafter displaying the area-weighted intensities which correspond to the picture elements in the others of said rows.

11. The invention of claim 10 wherein said assigning means includes means for assigning numerically successive ones of said threshold values to spatially separated picture elements of said submatrix.

12. A method for processing and thereafter displaying a dithered image, said image comprising a matrix of dithered image cells each having one of two predetermined intensities, said method comprising the steps of generating a row-and-column matrix of display points having respective intensities determined by the intensities of said dithered image cells and displaying said display point intensities in a plurality of interlaced fields, each said fields comprising alternate rows of said display point matrix, said generating step characterized by the step of determining the intensity of each one of said display points in accordance with the intensities of a cluster of said cells associated with said each one of said display points.

13. The invention of claim 12 wherein said determining step comprises the step of providing said each one of said display points with an intensity proportional to the average intensity of the cell cluster associated therewith.

14. The invention of claim 13 wherein in said determining step said associated group comprises a selected two-by-two submatrix of said cells.

15. The invention of claim 14 including the further step of generating said dithered image cell intensities, said further step comprising the steps of assigning respective dither thresholds to each of a plurality of received picture elements, providing a first cell intensity associated with each picture element having an intensity which exceeds its assigned dither threshold and providing a second cell intensity associated with each picture element having an intensity which does not exceed its assigned dither threshold.

16. The invention of claim 15 wherein said picture elements are arranged in a matrix comprising a plurality of submatrices and wherein said assigning step includes the step of assigning to each picture element of each of said submatrices a spatially corresponding threshold value from a predetermined dither matrix in which numerically successive threshold values are spatially separated from one another.

17. The invention of claim 16 wherein said dither matrix comprises $n^2$ dither thresholds, $n$ being an integer power of 2, said dither thresholds being arranged substantially in accordance with the order defined by a dither operator $\hat{D}_n$, said dither operator $\hat{D}_n$ comprising the matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangement, $\hat{D}_2$ being a two-by-two matrix comprising the numbers 0, 1, 2 and 3 and $\hat{U}_2$ being two-by-two matrix each element of which is 1.

18. In a method for presenting a dithered image in a plurality of interlaced scan lines, said image comprising a plurality of rows of dithered image cells each of which has one of two predetermined intensities, the improvement comprising the step of controlling the the intensity presented along each of said scan lines in accordance with the intensities of the cells in a selected two adjacent ones of said rows.

19. The invention of claim 18 wherein said controlling step includes the steps of determining the respective average intensities of a plurality of four-cell clusters, each of said clusters comprising a two-by-two submatrix of the cells of said selected rows, and controlling the intensity along said one of said scan lines in response to said average intensities.

20. A display method comprising the steps of, scanning an image to provide a row-and-column matrix of picture elements each having a predetermined intensity, assigning each of a predetermined plurality of dither threshold values to a different one of the picture elements of at least a first submatrix of said picture elements, generating an area-weighted intensity corresponding to each one of said picture elements, said area-weighted intensity being determined by the number of picture elements in a selected cluster thereof which have intensities greater than their respective assigned dither threshold values, said selected cluster including at least said one of said picture elements, second and third picture elements each immediately afjacent in said picture element matrix to said one of said picture elements and and a fourth picture element immediately adjacent in said picture element matrix to both said second and said third picture elements, and displayiing the area-weighted intensities which correspond to the picture elements in a selected set of alternate rows of said matrix and thereafter, displaying the area-weighted intensities which correspond to the picture elements in the others of said rows.

21. The invention of claim 20 wherein said assigning step includes the step of assigning numerically successive ones of said threshold values to spatially separated picture elements of said submatrix.

* * * * *

UNITED STATES PATENT AND TRADEMARK OFFICE
CERTIFICATE OF CORRECTION

PATENT NO. : 3,953,668
DATED : April 27, 1976
INVENTOR(S) : Charles N. Judice

It is certified that error appears in the above-identified patent and that said Letters Patent are hereby corrected as shown below:

Column 2, line 67, "off" should read --odd--. Column 4, line 36, "off" should read --odd--; line 62, "0001" should read --1001--. Column 6, line 8, "$D_2$" should read --$\hat{D}_2$--; line 18, "$\hat{d}_n$" should read --$\hat{D}_n$--; line 52, after "video" delete "display". Column 8, line 2, "off" should read --odd--. Column 10, line 40, after "intensities" delete the period and insert a comma. Column 12, line 14, after "being" insert --a--;

Signed and Sealed this

Twenty-eighth Day of September 1976

[SEAL]

Attest:

RUTH C. MASON
Attesting Officer

C. MARSHALL DANN
Commissioner of Patents and Trademarks